Patented Dec. 15, 1942

2,305,067

UNITED STATES PATENT OFFICE 2,305,067

PROCESS FOR BREAKING PETROLEUM EMULSIONS

Melvin De Groote, University City, Mo., assignor to Petrolite Corporation, Ltd., Wilmington, Del., a corporation of Delaware No Drawing. Application June 25, 1941, Serial No. 399,728

5 Claims. (Cl. 252—335)

This invention relates primarily to the resolution of petroleum emulsions.

One object of my invention is to provide a novel process for resolving petroleum emulsions of the water-in-oil type, that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

Another object is to provide an economical and rapid process for separating emulsions which have been prepared under controlled conditions from mineral oil, such as crude petroleum and relatively soft waters or weak brines. Controlled emulsification and subsequent demulsification under the conditions just mentioned is of significant value in removing impurities, particularly inorganic salts, from pipeline oil.

Attention is directed to U. S. Patent No. 2,184,-794, dated December 26, 1939, to Melvin De Groote. Said patent is concerned with an ester, particularly a water-soluble ester, of the following composition:

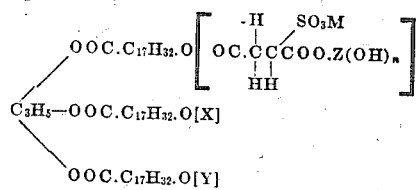

in which X and Y are selected from the group consisting of hydrogen atoms; and

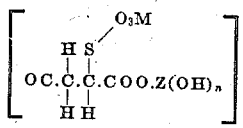

radicals, and $Z(OH)_n$ is a polyhydric alcohol residue, and $n$ is a small whole number which is at least 1; and M is selected from the group consisting of a metallic atom, an ammonium radical and an amine radical.

Reference to $Z(OH)_n$ being a polyhydric alcohol residue is intended to conform in meaning with what appears in aforementioned U. S. Patent No. 2,184,794, in substantially the following language:

"It is obvious that the radicals employed to replace the carboxylic hydrogen atom or atoms of maleic acid must contain at least one residual hydroxyl and preferably two. For this reason, it is evident that various other materials are the functional equivalent of glycerol. For instance, ethylene glycol, propylene glycol, diglycerol, triglycerol, polyglycerol, various glycols in which the ether linkage appears, such as diethylene glycol, etc. It is also obvious that glycerol chlorhydrin or some other similar chlorhydrin or some oxide such as glycidol, also would be the functional equivalent of glycerol."

The products described in said aforementioned patent are derived from triricinolein (castor oil) and are water-soluble. Indeed, they show colloidal water solubility beyond the range in which surface-active agents are ordinarily employed. For instance, surface-active agents may be employed in concentrations as low as one part to 30,000, or perhaps as high as a few parts per hundred, depending upon the specific nature of the industrial application involved. Such variation in concentration may depend on whether one is concerned with demulsification of oil field emulsions of the water-in-oil type, or is concerned with the formation of emulsions of the oil-in-water type. Oddly enough, I have discovered that if one produces a variant, new species or sub-species, or a new analog of the type of material described in the forementioned De Groote patent, which new compound is characterized by the presence of a long chain hydrophile group, such new variant or analog has some unlooked-for properties. All such variants or analogs are derivatives of triricinolein, specifically and without exception. These new properties cannot be co-related to water solubility, for the reason that water solubility of the type of material described in the aforementioned De Groote patent is more than ample for the purposes intended in said patent or related uses. It is more likely that the new variant herein contemplated as a new chemical compound or composition of matter owes its improved quality to the manner in which the introduction of the long chain hydrophile group or groups alter its orientation at interfaces, particularly oil-water interfaces.

I have found that if compounds are manufactured somewhat similarly to those described in the aforementioned De Groote Patent No. 2,184,794, so as to correspond to the following formula:

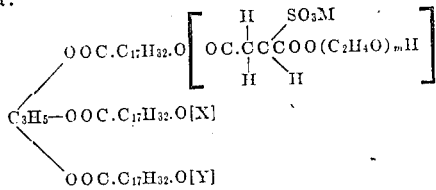

in which $m$ is a small whole number varying from 7 through 17, and X and Y are selected from the group consisting of hydrogen atoms:

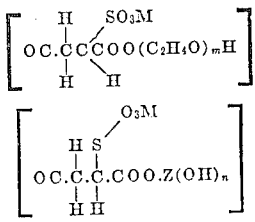

radicals, one obtains a new compound or composition of matter that is particularly valuable as a demulsifier for petroleum emulsions of the water-in-oil type. The various symbols have their prior significance. Subsequently certain further modifications will be described. In essence, glycerol as a reactant in the procedure described in U. S. Patent No. 2,184,794, as far as combination with sulpho-succinic acid radicals is concerned, is replaced by a polyethylene glycol of the kind exemplified by hepta-ethylene glycol, octaethylene glycol, nonaethylene glycol, to and including heptadecylene glycol. In this connection, attention is directed to the fact that the aforementioned patent contemplates the use of various glycols in which the ether linkage appears, such as diethylene glycol. I have found, however, that the property of the type of compound herein contemplated is not significantly different from those in the aforementioned U. S. patent, when the ether linkage occurs only one time, or two or three times, for instance, as when diethylene glycol is used as a reactant in the manufacture of such compounds, instead of glycerol; but it does change enormously when one employs long chain glycols in which the ether linkage reoccurs a large number of times; for example, as when one employs nonaethylene glycol or the like.

As far as I am aware, in view of what has been said previously, this marked enhancement in valuable properties, particularly in respect to certain industrial applications, is entirely unpredictable. Said aforementioned U. S. Patent No. 2,184,794 makes reference in turn to U. S. Patent No. 2,028,091, dated January 14, 1936, to Jaeger. Said Jaeger patent is concerned with a broad genus in which various hydroxylated bodies may be combined with a carboxyl radical of sulfosuccinic acid; for instance, such sulfo acid may be combined with octyl alcohol, capryl alcohol, tetrahydrofurfural alcohol, and the like. The present invention is not concerned with such esters in which such other radicals or groups appear. The peculiar advantage herein noted appears only in such instances where the triricinolein radical and the polyalkylene glycol radical of the kind hereinafter described, appear jointly in the same molecule. Invention is strictly so limited; and as far as I am aware, the introduction of a polyalkylene, particularly a polyethylene glycol radical into such other compounds, does not produce a similar or comparable improvement in properties.

Insofar that the aforementioned U. S. Patent No. 2,184,794 contains a complete description of the manufacture of these products from glycerol or the like; and since nonaethylene glycol and similar products are commercially available, it hardly appears necessary to describe the product and the method of manufacture of the same, although this will be done purely as a matter of convenience.

Briefly, then, my present invention consists in resolving or breaking petroleum emulsions with a chemical demulsifier comprising esters derived from sulfosuccinic acid by esterification of one carboxylic hydrogen atom by means of triricinolein; and the other carboxylic hydrogen atom by means of a polyalkylene glycol of the kind described, in such a manner that there is present a residual hydroxyl radical attached to the glycol residue; the ester is furthermore characterized by the fact that the sulfonic hydrogen atom is replaced by a metallic atom, an ammonium radical, or an amine radical, including an alkylolamine radical, or any salt-forming cation. The peculiar combination of two such widely dissimilar alcoholic bodies with sulfodicarboxylic acids, presents certain remarkable properties, due to unexpected co-operation between these dissimilar alcoholic radicals, i. e., the triricinolein radical and the polyalkylene glycol radical, as previously suggested.

In referring to polyethylene glycols as reactants for the introduction of the desired polyalkylene glycol radical, it is to be noted that the polypropylene glycols or polybutylene glycols could also be employed. Thus, for convenience, in the broadest aspect the polyalkylene glycols employed may be indicated by the following formula:

$$OH(C_nH_{2n}O)_mH$$

in which $m$ has its previous significance and $n$ represents a numeral varying from 2 to 4.

As far as the range of oxyalkylated compounds employed as reactants is concerned, it is my preference to employ those having approximately 8-12 oxyalkylene groups, particularly 8-12 oxyethylene groups. The preference to use the oxyethylated compounds is due, in part, to the fact that they are commercially available, and particularly so in two desirable forms. The most desirable form is the so-called nonaethylene glycol, which, although consisting largely of nonaethylene glycol, may contain small amounts of heptaethylene and octaethylene glycols, and possibly minor percentages of the higher homologs. Such glycols represent the upper range of distillable glycols; and they may be conveniently referred to as "upper distillable ethylene glycols." There is no particularly good procedure for making a sharper separation on a commercial scale; and it is understod that mixtures of one or more of the glycols may be employed, as well as a single glycol. As pointed out, it is particularly preferred to employ nonaethylene glycol as commercially available, although it is understood that this product contains other homologs, as indicated.

Substantially as desirable as the upper distillable polyethylene glycols, are the lower nondistillable polyethylene glycols. These materials are available in the form of a waxy water-soluble material, and the general range may vary somewhat from deca- to tetradecaethylene glycol.

As is well understood, the method of producing such glycols would cause some higher homologs to be formed; and thus, even in this instance, there may be present some oxyethylene glycols within the higher range above indicated. One need not point out that these particular compounds consist of mixtures, and that in some instances, particularly desirable esters are obtained by making mixtures of the liquid nonaethylene glycol with the soft, waxy, lower non-distillable polyethylene glycols. For the sake of convenience, reference in the examples will be to nonaethylene glycol; and calculations will be based on a theoretical molecular weight of 414. Actually, in manufacture, the molecular weight of the glycol employed, whether a higher distillable polyethylene glycol, or a lower non-distillable polyethylene glycol, or a mixture of the same, should be determined and reaction conducted on the basis of such determination, particularly in conjunction with the hydroxyl or acetyl value.

If castor oil or triricinolein is esterified with a mole of maleic anhydride until one carboxyl disappears, the composition of the product is as follows:

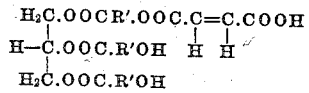

where R' designates the ricinoleic acid nucleus or residue. If this product is then treated with a mole of a polyalkylene glycol of the kind previously described, the composition then becomes as follows:

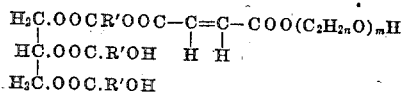

If this material is then treated with sodium bisulphite, for example, the resulting product becomes:

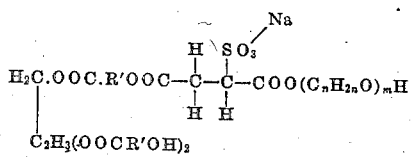

Naturally, instead of using one mole of maleic anhydride, one could employ two moles of maleic anhydride, followed by the use of two moles of the selected glycol; or, if desired, one could use three moles of maleic anhydride, followed by the use of three moles of glycol. If two moles of maleic anhydride were used, one would necessarily employ two moles of sodium bisulfite or its equivalent. Similarly, if one employed three moles of maleic anhydride, one would employ three moles of sodium bisulfite or the like.

It is understood, of course, that a polymaleated triricinolein may be esterfied by employing one mole of a polyalkylene glycol of the kind described, and one mole of some other polyhyric alcohol, for instance, glycerol or diethylene glycol.

The manufacture of monomaleated, dimaleated, and trimaleated triricinolein is well known. There is no difficulty in obtaining either the monomaleated or dimaleated product; but it is somewhat difficult to convert completely triricinolein into the trimaleated product. Generally speaking, one is more apt to obtain a mixture containing some trimaleated triricinolein, and some dimaleated triricinolein.

The reagent or demulsifier that I prefer to use in practicing my process is prepared by treating one mole or triricinolein in the form of castor oil with two moles of maleic anhydride at a relatively low temperature, for instance, 140° C., or thereabouts, until one obtains a product having only one hydroxyl and having two free carboxylic radicals. Generally speaking, if the temperature of esterification is held reasonably low, one finds that when the product indicates the proper acid value (i. e., the existence of two free carboxyl radicals), it will automatically have the proper hydroxyl or acetyl value.

Such product can then be converted into various specific examples, by means of procedures such as the following:

*Intermediate product, Example 1*

One pound mole of dimaleated triricinolein is esterified with two pound moles of nonaethylene glycol at approximately 140° C. until the acid value disappears completely, and the product shows the proper acetyl or hydroxyl value. Needless to say, if the temperature is properly controlled and the fractional ester has been suitably prepared, then when the acid value disappears completely, the product will have the proper hydroxyl or acetyl value. Dried carbon dioxide or some other dried inert gas may be employed to hasten esterification. Esterification is also hastened at times by the presence of a comparatively minute amount of a sulfonic acid. Dried hydrochloric acid gas may also be employed.

*Intermediate product, Example 2*

A mixture of lower non-distillable polyethylene glycols representing approximately deca- to tetradecaethylene glycol, is substituted for nonaethylene glycol in the preceding example.

*Intermediate product, Example 3*

A 50–50 mixture of nonaethylene glycol and lower non-distillable polyethylene glycols of the kind described in the previous example is substituted for nonaethylene glycol in Example 1.

*Intermediate product, Example 4*

The same procedure is employed as in Intermediate Product, Examples 1–3, inclusive, except that one pound mole of the nonaethylene glycol is replaced by one pound mole of glycerol. For instance, in Intermediate product, Example 1, two pound moles of nonaethylene glycol are replaced by a mixture of one pound mole of nonaethylene glycol and one pound mole of glycerol.

*Intermediate product, Example 5*

Trimaleated triricinolein is treated with sufficient nonaethylene glycol to convert all carboxyl radicals into the ester.

*Intermediate product, Example 6*

Monomaleated triricinolein is esterified with polyethylene glycols of the kind described in Intermediate product, Examples 1, 2 and 3, preceding.

The intermediate products so obtained are then treated in the conventional manner with sufficient bisulfite, for instance, sodium or ammonium bisulfite, in the form of a concentrated solution, or fairly strong aqueous solution, so as to convert all maleic acid radicals into the corresponding sulfosuccinic acid radicals. The action is continued until there is no longer any free inorganic bisulfite present, or at the most, only insignificant percentages, with the result that one obtains a material which is readily water-soluble, even in relatively small amounts, such as less than 1%. Needless to say, the reaction is not limited to sodium bisulfite, but one may employ any functional equivalent, for instance, potassium bisulfite, amylamine bisulfite, ethanolamine bisulfite, diethanolamine bisulfite, triethanolamine bisulfite, morpholine bisulfite, cyclohexylamine bisulfite, benzylamine bisulfite, etc. One procedure commonly employed is to add a suitable basic material to the ester in such a manner as to prevent saponification and then pass in sulfur dioxide gas.

Needless to say, maleic acid, of course, can replace maleic anhydride in the procedure previously described for manufacturing the new composition of matter herein contemplated. The same is true of the corresponding acyl halide, such as maleyl chloride. It is further obvious that nonaethylene glycol monomaleate or the like could be employed to act as a combined equivalent of both maleic anhydride and nonaethylene glycol or its equivalent. Sulfosuccinic acid sodium salt, if available, could of course act as a substitute for both sodium bisulfite and maleic anhydride or maleic acid. Similarly, nonaethylene glycol ester of sodium sulfosuccinic acid could be employed as a combined substitute for sodium bisulfite, maleic anhydride, and nonaethylene glycol. There may be other obvious equivalents which would be perfectly apparent to a skilled chemist; and no further elaboration is required. It is immaterial what particular procedure or method is employed to manufacture the chemical compounds or composition of matter employed as the demulsifier in my new process for resolving petroleum emulsions of the water-in-oil type. Wherever available, naturally isomeric forms of the various compounds may be employed. The compounds herein contemplated may be manufactured in the manner herein described, or may be manufactured by any suitable process.

In the hereto appended claims, it is understood that wherever an ionizable hydrogen atom of a sulfonic radical has been replaced by the metallic sodium atom, that ammonium radicals, amine radicals, other metallic atoms, etc. are the functional equivalents thereof. Similarly, in the appended claims, wherever reference to a glycerol radical, or rather, to a dihydroxy propyl radical, appears, it is understood that any similar radical having at least one free hydroxyl, even though it be of an alkyl-oxy-alkyl nature (i. e., containing an ether linkage), rather than simply an alkyl radical, is also the functional equivalent thereof. Various radicals of this type have been enumerated previously.

In the hereto attached claims it intended that the formula shall not be limited to any particular isomeric form. If the same product can exist in more than one isomeric form, it is understood that all such isomeric forms are included. For the sake of convenience, triricinolein in the hereto attached claims is considered as being a trihydric alcohol of the composition:

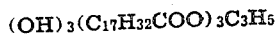

Conventional demulsifying agents employed in the treatment of oil field emulsions are used as such, or after dilution with any suitable solvent, such as water; petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials intended to be used as the demulsifier in my process, may be admixed with one or more of the solvents customarily used in connection with conventional demulsifying agents, provided that such compounds are compatible. They will be compatible with the hydrophile type of solvent in all instances. Moreover, said material or materials may be used alone, or in admixture with other suitable well known classes of demulsifying agents.

It is well known that conventional demulsifying agents may be used in a water-soluble form, or in an oil-soluble form, or in a form exhibiting both oil and water solubility. Sometimes they may be used in a form which exhibits relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials herein described, except that they are invariably water-soluble.

I desire to point out that the superiority of the reagent or demulsifying agent contemplated in my herein described process for breaking petroleum emulsions, is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practising my improved process for resolving petroleum emulsions of the water-in-oil type, a treating agent or demulsifying agent of the kind above described is brought into contact with or caused to act upon the emulsion to be treated, in any of the various ways, or by any of the various apparatus now generally used to resolve or break petroleum emulsions with a chemical reagent, the above procedure being used either alone, or in combination with other demulsifying procedure, such as the electrical dehydration process.

The demulsifier herein contemplated may be employed in connection with what is commonly known as down-the-hole procedure, i. e., bringing the demulsifier in contact with the fluids of the well at the bottom of the well, or at some point prior to their emergence. This particular type of application is decidedly feasible when the demulsifier is used in connection with acidification of calcareous oil-bearing strata, especially if suspended in or dissolved in the acid employed for acidification.

It may be well to emphasize once more that the compounds herein contemplated, although most desirably obtained from polyethylene glycols, may also be obtained from butylene or propylene glycols, in which the ether linkage appears at least seven times and not more than seventeen times. Those obtained from polyethylene glycols of the kind described, however, are enormously better for most purposes, particularly demulsification of crude oil emulsions, than those derived from propylene glycols or butylene glycols.

Attention is directed to my co-pending applications, Serial Numbers 399,729 and 399,730, filed June 25, 1941.

Having thus described my invention, what I claim as new and desire to secure by Letters Patent is:

1. A process for resolving petroleum emulsions of the water-in-oil type, which consists in subjecting the emulsion to the action of a demulsifying agent comprising a water-soluble ester of the following composition:

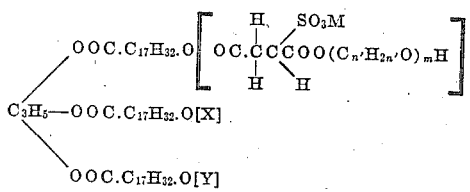

in which M is selected from the group consisting of a metallic atom, an ammonium radical, and an amine radical; $m$ is a small whole number varying from 7 through 17; $n'$ is a numeral from 2 to 4; and X and Y are selected from the group consisting of hydrogen atoms

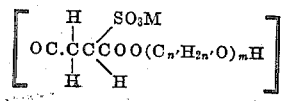

and

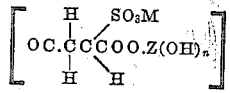

radicals, in which $Z(OH)_n$ is a polyhydric alcohol residue, and $n$ is a small whole number which is at least 1.

2. A process for resolving petroleum emulsions of the water-in-oil type, which consists in subjecting the emulsion to the action of a demulsifying agent comprising a water-soluble ester of the following composition:

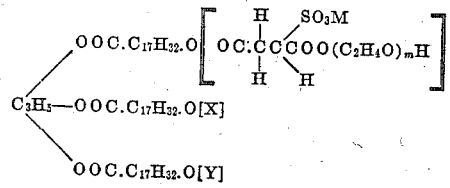

in which $m$ is a small whole number varying from 7 through 17; M is selected from the group consisting of a metallic atom, an ammonium radical, and an amine radical; and X and Y are selected from the group consisting of hydrogen atoms,

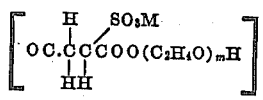

and

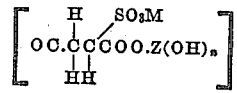

radicals, in which $Z(OH)_n$ is a polyhydric alcohol residue, and $n$ is a small whole number which is at least 1.

3. A process for resolving petroleum emulsions of the water-in-oil type, which consists in subjecting the emulsion to the action of a demulsifying agent comprising a water-soluble ester of the following composition:

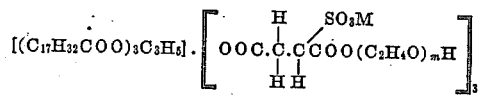

where M is selected from the group consisting of a metallic atom, an ammonium radical, and an amine radical; and $m$ is a small whole number varying from 7 through 17.

4. A process for resolving petroleum emulsions of the water-in-oil type, which consists in subjecting the emulsion to the action of a demulsifying agent comprising a water-soluble ester of the following composition:

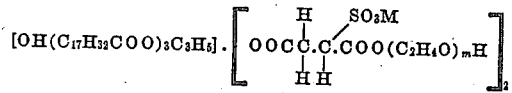

where M is selected from the group consisting of a metallic atom, an ammonium radical, and an amine radical; and $m$ is a small whole number varying from 7 through 17.

5. A process for resolving petroleum emulsions of the water-in-oil type, which consists in subjecting the emulsion to the action of a demulsifying agent comprising a water-soluble ester of the following composition:

where M is selected from the group consisting of a metallic atom, an ammonium radical, and an amine radical; and $m$ is a small whole number varying from 7 through 17.

MELVIN DE GROOTE.